United States Patent [19]

Wiher et al.

[11] Patent Number: 5,323,386

[45] Date of Patent: Jun. 21, 1994

[54] EXPANDABLE HIGH SPEED SERIAL DATA SWITCH

[75] Inventors: Christian R. Wiher, Redondo Beach; Christopher J. Miller, Manhattan Beach; Michael J. Salamone, Torrance; Jeffrey L. Mullin, Manhattan Beach, all of Calif.

[73] Assignee: TRW Inc., Redondo Beach, Calif.

[21] Appl. No.: 11,939

[22] Filed: Feb. 1, 1993

[51] Int. Cl.⁵ .............................................. H04J 3/02
[52] U.S. Cl. ................................. 370/54; 370/58.2; 370/65.5; 340/825.8
[58] Field of Search ................. 370/54, 58.1, 58.2, 370/60, 63, 64, 65.5, 60.1, 65, 94.1, 94.2; 340/825.8

[56] References Cited

U.S. PATENT DOCUMENTS

| | | | |
|---|---|---|---|
| 4,022,982 | 5/1977 | Hemdal | 370/54 |
| 4,400,627 | 8/1983 | Zola | 370/54 |
| 4,970,505 | 11/1990 | Hirata et al. | 340/825.8 |
| 5,084,867 | 1/1992 | Tachibana et al. | 370/54 |

Primary Examiner—Douglas W. Olms
Assistant Examiner—Min Jung
Attorney, Agent, or Firm—Ronald L. Taylor

[57] ABSTRACT

A switching system comprised of input, intermediate and output switch matrices. There are r n×m input matrices, r m×n output matrices with m r×r intermediate switching matrices. Signals are switched from inputs at the input matrices through the intermediate switch matrices and are output through the output matrices.

7 Claims, 6 Drawing Sheets

ONE-TO-ONE CONNECTION RESULTS

FLOATING BROADCAST RESULTS

UNIFORM BROADCAST WITH DUMB CONNECTIONS

UNIFORM BROADCAST WITH SMART CONNECTIONS

EXPANDABLE HIGH SPEED SERIAL DATA SWITCH

BACKGROUND OF THE INVENTION

1. Field of the Invention

This invention relates generally to high-speed switching networks, and more particularly to a non-blocking high-speed switch.

2. Description of the Related Art

In the field of communications and data distribution, the need to switch greater numbers of signals at higher speeds has become increasingly important. State of the art switches must be able to accept a wide variety of signal formats in order to ensure compatibility between the systems interconnected via the switch. The signals can be analog or digital, processed or unprocessed. The signals can be centered at different frequencies with different band widths, and can be transmitted at different sampling rates with different word sizes. Current distribution schemes are inadequate to deal with the many existing signal formats and cannot easily grow to support future users.

Switch architectures, the heart of a wide band distribution network, have been an active area of research for over forty years. There are several design constraints which identify those characteristics desirable for an optimum switch network: the number of cross points required, the blocking or nonblocking characteristics, the degree of built-in redundancy, ease of control, and the need for interchannel rate synchronization.

Over the years, a number of switch architectures have been studied by authorities in this field. One commonly studied switch is a crossbar switch. In a crossbar switch, the inputs and outputs are arranged in a matrix array, with each input being tied to each output. The crossbar switch is non-blocking, asynchronous, and easily expandable. However, the number of cross points required to implement an N×N switch grows as $N^2$. Also, there is only one path from any given input to any given output. Thus, a crossbar switch has no built in redundancy if an internal crosspoint fails. Another fairly well known switch, commonly referred to as the Clos switch, as disclosed in "A Study of Non-Blocking Switching Networks", the Bell System Technical Journal, Volume XXXII, March 1953, consists of a three-stage network which is one-to-one nonblocking and asynchronous. The Clos network has a significant advantage over a crossbar network in that it takes fewer crosspoints to implement a large switch array. Specifically, while an N×N crossbar switch grows as $N^2$, a N×N Clos switch grows as $6N^{3/2} - 3N$. Also, the Clos network provides multiple paths from each input to each output, thereby building in redundancy. However, the broadcast capabilities of a Clos switch are limited, and it is not as easily expandable as is a crossbar network. Specifically, since the Clos switch is nonsymmetric, each configuration is unique. This means a complete reconfiguration is required when attempting to expand the switch.

In general, the ideal switch should require as few crosspoints as possible. This would reduce the size and complexity of the switch, as well as reduce the power requirements to operate the switch. Likewise, the need to ensure the switch is non-blocking and has built-in redundancy becomes self apparent: a blocked signal or signal switching failure due to an equipment failure decreases the switch's reliability and increases the risk that critical information may be lost.

The ideal switch should also be easy to control, since unduly complex control schemes make the system more difficult to expand and service. Relatedly, a switch reliant upon interchannel rate synchronization increases the complexity of the control scheme because clock characteristics must be preserved as the signal progresses through the switch.

It would therefore be advantageous to provide for a switch to be used in a wide band distribution system where the switch is nonblocking and has built in redundancy to reduce sensitivity to equipment failures. The switch should use as few crosspoints as possible to reduce the complexity of the switch, and should have a control scheme which is easily implemented. As such, the switch should be capable of switching asynchronous signals without needing interchannel rate synchronization. Also, the switch should be symmetric, allowing it to be expanded readily from basic switch elements rather than requiring a complete reconfiguration to expand its capacity. This allows switches to be constructed to suit particular needs without requiring unique switch designs for the various capacity requirements.

SUMMARY OF THE INVENTION

It is therefore an object of the present invention to provide for a switching system used in a wide band distribution system capable of switching a large number of high speed signals. It is a further object to provide for a high speed switch having non-blocking characteristics. It is another object to provide for a high speed switch having built-in redundancy. It is a further objective to provide for a switch requiring no interchannel rate synchronization.

In accordance with the teachings of the present invention, a multiple stage switch is provided for switching a plurality of asynchronous signals at high speeds. The switch is provided with an input stage for receiving and switching a plurality of incoming signals. An intermediate stage receives and switches a plurality of the output signals from the input switches. An output stage is provided for switching the signals from the middle switches of the intermediate stage to predetermined destinations.

One feature of the present invention is that the rate of geometric growth of the number of crosspoints required is significantly less than that of a crossbar switch.

BRIEF DESCRIPTION OF THE DRAWINGS

Other objects, features and advantages of the present invention can be better understood by referencing the foregoing description of the presently preferred embodiment in conjunction with the drawings in which.

DESCRIPTION OF THE PRESENTLY PREFERRED EMBODIMENTS

Figure 1:
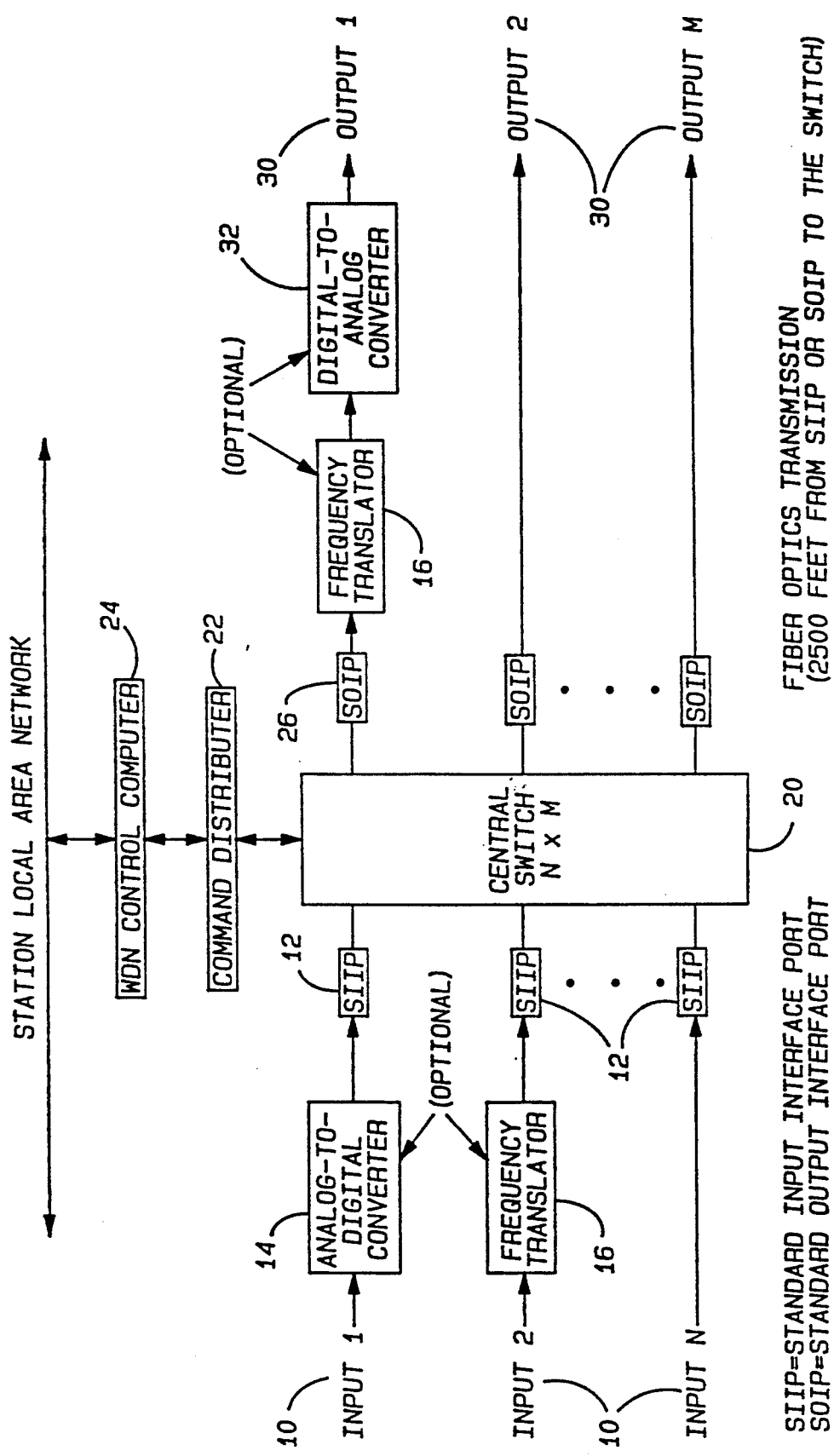
FIG. 1 is a functional block diagram of a wide band distribution network employing a high-speed switch.

Wide band distribution networks can be used in a variety of applications, from telephone communications to satellite ground stations. In general, the network takes incoming signals and routes these signals to the appropriate destination. More particularly, the incoming signals can be either analog or digital, and the analog signals can either be handled without any preprocessing or can be digitized using an analog-to-digital converter. As illustrated in FIG. 1, there are N input signals 10 leading to the input interfaces 12. It should be noted that it is preferable to digitize analog signals due to the loss in signal strength that could otherwise be experienced by transmitting analog signals over great distances. Thus, if an input signal is analog, an analog-to-digital converter 14 can be utilized to convert the analog signal to a digital signal. Similarly, a digital input signal 10 may require preprocessing by a frequency translator 16 before it reaches the input interface 12. The interfaced signals are then transmitted through the central switch 20, which routes the call from the inputs to the proper outputs. The central switch 20 switches the signals based upon the switching scheme enforced by the command distributor 22 which is in turn controlled by the wide band distribution network control computer 24. The switched signal is transmitted by the central switch 20 to output interfaces 26. In general, there are M number of outputs. Before the output signals 30 are transmitted to their ultimate destination, it may be necessary to condition the signal using devices such as a frequency translator 16 or digital-to-analog converter 32. It can be appreciated by one of ordinary skill in the art that the number of input signals 10, output signals 30, the types of preprocessing and postprocessing performed on those signals and the configuration of the input interface ports 12 and output interface ports 26 can take on a variety of configurations as best suits the needs of the particular application.

Figure 2:
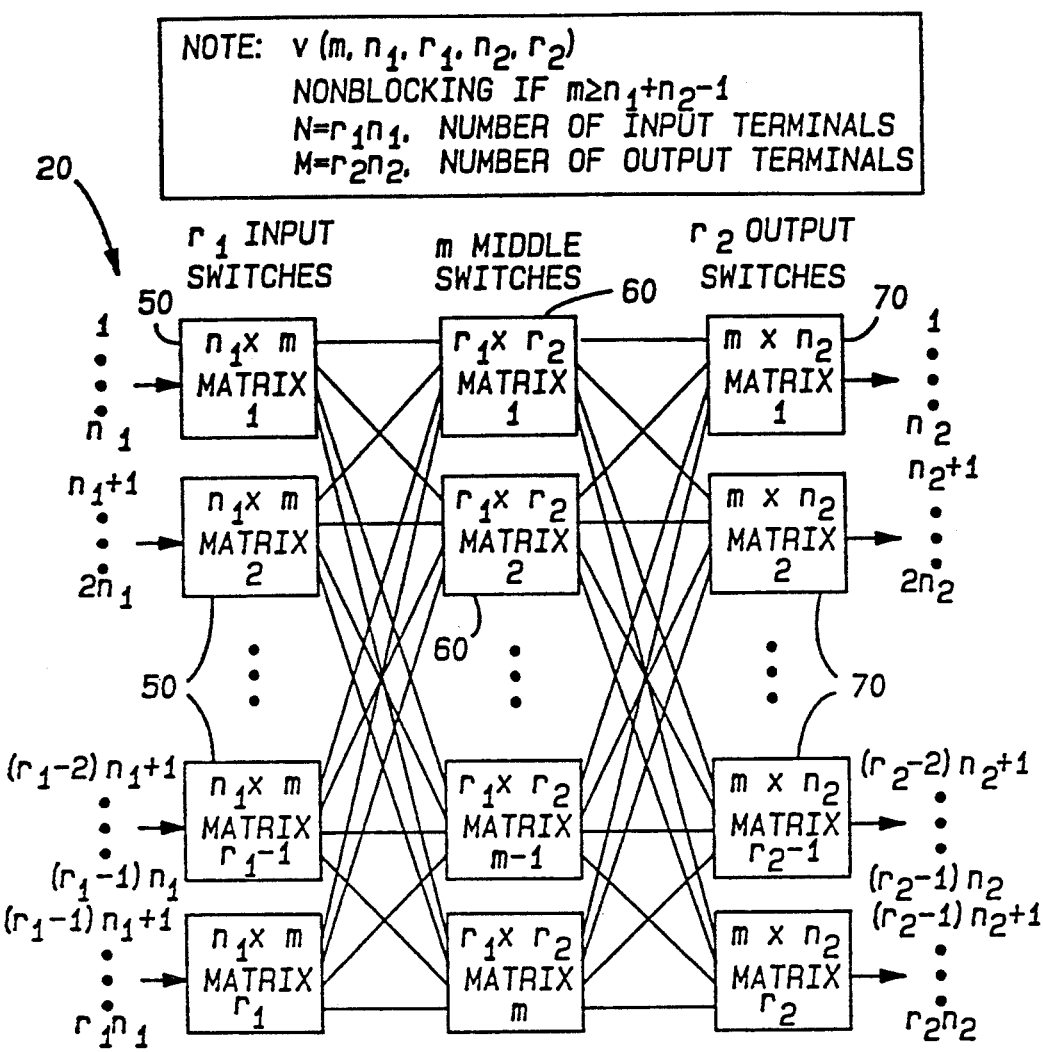
FIG. 2 is a diagram of a three-stage network.

The N×M central switch 20 is shown in greater detail in FIG. 2. The N inputs are switched by the switch 20 to the M outputs by way of a staged switch matrix. The N inputs are handled distributively by $r_1$ number of input switches 50. Each input switch 50 consists of a $n_1 \times m$ switch matrix. Given that $N = r_1 n_1$, each of the $r_1$ input switches 50 handles $n_1$ number of incoming signals. The intermediate stage of the central switch 20 consists of m number of $r_1 \times r_2$ switch matrices. The final stage of the central switch 20 consists of $r_2$ number of output switches 70, each of which is a $m \times n_2$ switch matrix.

Figure 3:
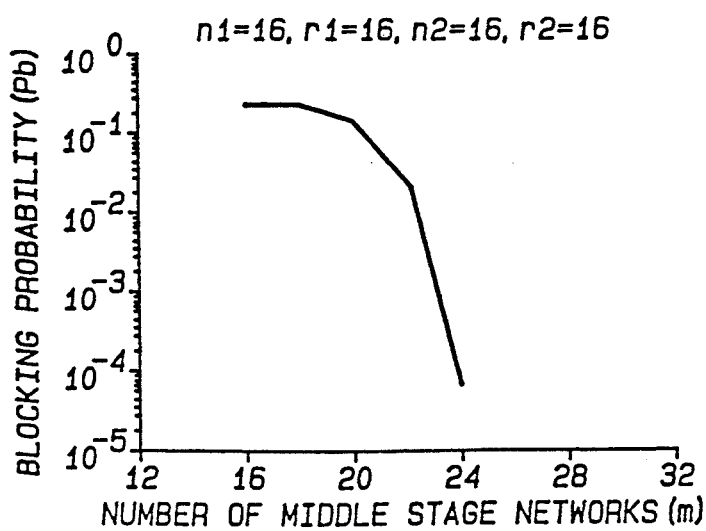
FIGS. 3 and 4 are graphs showing the relationship between the number of middle stage network switches and the blocking probability for a three-stage network.

Based upon this generic switch architecture, a series of tests in the form of simulations were performed to determine the blocking characteristics of the switch in the broadcast mode. The first simulation was used to verify the switch model and connection algorithms, the goal being to measure the blocking probabilities as a function of the number of middle switches. In the simulation, the network was filled to capacity, having all the inputs and outputs connected; next, with the switch full, input and output pairs were randomly swapped. Throughout the simulation, the switch remained full, with the exception of temporary interruptions caused by a block. 100,000 trial simulations were run for increasing values of m, the number of middle switches. As shown in FIG. 3, the blocking probability falls off rapidly at $m = 24$. The asymptotic behavior of the simulation agreed with the Clos theorem, which requires $m \geq 2n - 1$ for zero one-to-one blocking probability. In this case, given that $n = 16$, the Clos theorem predicts that the network would be nonblocking for $m \geq 31$.

Figure 4:
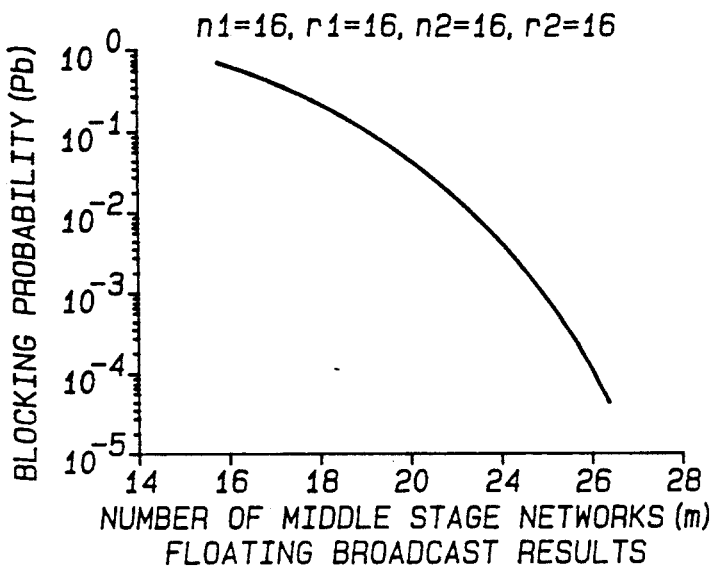

A second simulation was then run to ascertain the broadcast capabilities of the network. The simulation modeled a connection scenario where every output had the opportunity to connect to an input without regard for how many outputs the input may have already been connected to. Again, 100,000 trials were run for each value of m, the number of middle switches. As shown in FIG. 4, the blocking probability for $m = 26$ was on the order of 1 per 100,000 signals switched. No blocks were detected for $m = 31$.

Figure 5:
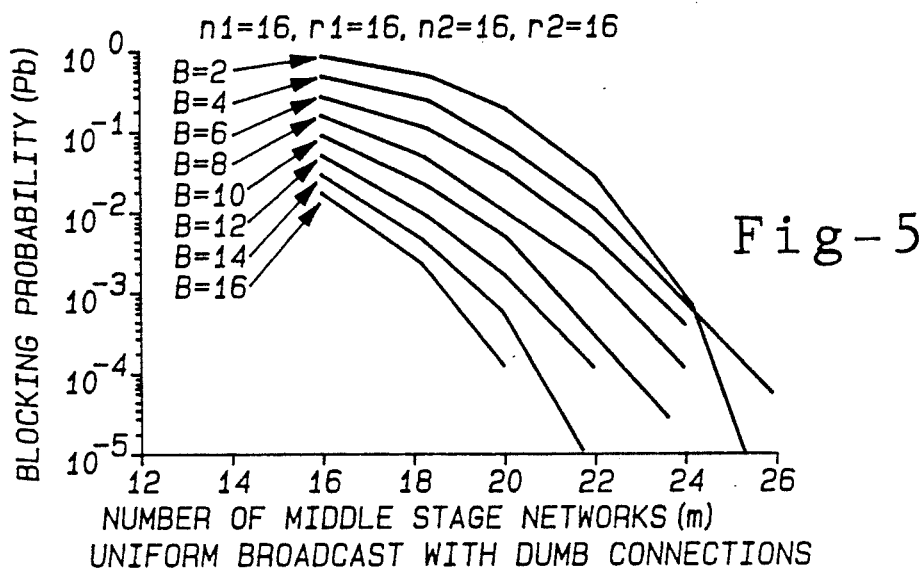
FIGS. 5 and 6 are graphs illustrating the relationship between the number of middle stage network switches and the blocking probability as the switch broadcast density is changed.

To further explore the blocking characteristics of the network under broadcast conditions, a third simulation was run. Here, under the uniform broadcast simulation, the broadcast density was controlled such that the number of outputs connected to a given input was uniformly distributed between 1 and B, where B is a maximum broadcast amount. This simulation was utilized to verify the performance of two different network connection schemes. The first scheme, called the dumb connection method, involved connecting the inputs with the outputs one at a time without regard for the particular grouping of the outputs. For example, if the broadcast density was 10, a single input would be connected to as many as 10 outputs, where those 10 outputs would not necessarily be grouped within a particular output switch matrix. As illustrated in FIG. 5, the blocking probability for the dumb connection network scheme decreases for increasing broadcast amounts. This performance improvement is realized by taking advantage of the inherent broadcast capability in each middle stage switch.

Figure 6:
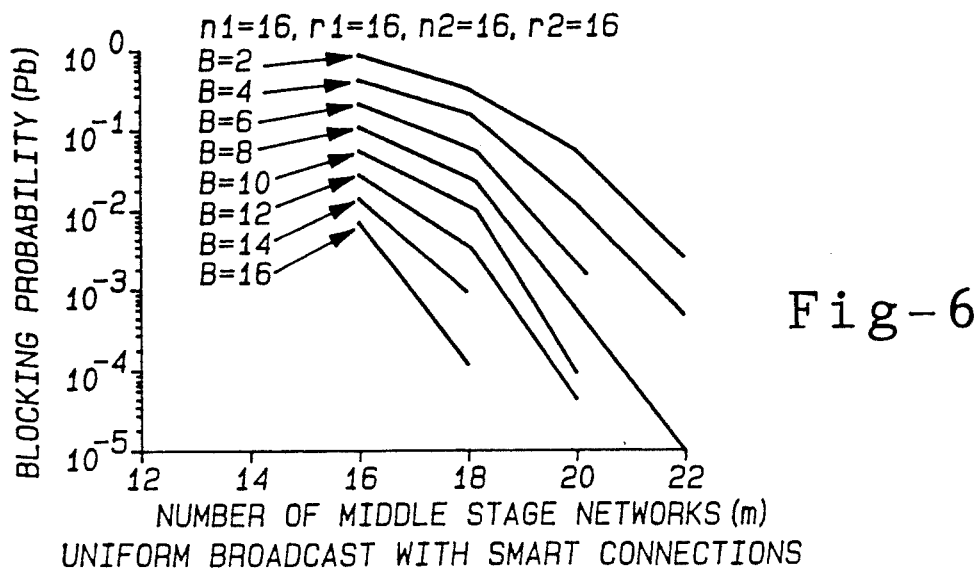

The preferred network connection scheme, whose blocking probability is charted in FIG. 6, involves grouping the outputs according to their associated output switch stage. In this smart connection network scheme, the middle switch yielding the most active connections of a given set of output switches to a particular input is chosen and all possible outputs are connected through that middle switch. The grouping and selection process is repeated until all outputs are connected. For example, if you have an active connection between an input x and an output y, that means that an active path exists from an input switch which receives x to a given middle switch and from that given middle switch to an output switch that transmits y. If it is desirable to connect an output z to input x, it is advantageous to use the same middle switch to connect x and z that connects x and y. This eliminates the need for an additional path between the input and middle stage switch and takes advantage of the full broadcast capability inherent in the 16×16 matrix switches. Thus, when choosing a middle switch which determines the path through the network, if a connection is to be made from an output to an input that is already in use, a selection is made between available middle switches based on which one is currently broadcasting the desired input to the greatest number of output switches. Using the smart connection network scheme, the blocking probability was significantly reduced as the broadcast density increased.

Figure 7:
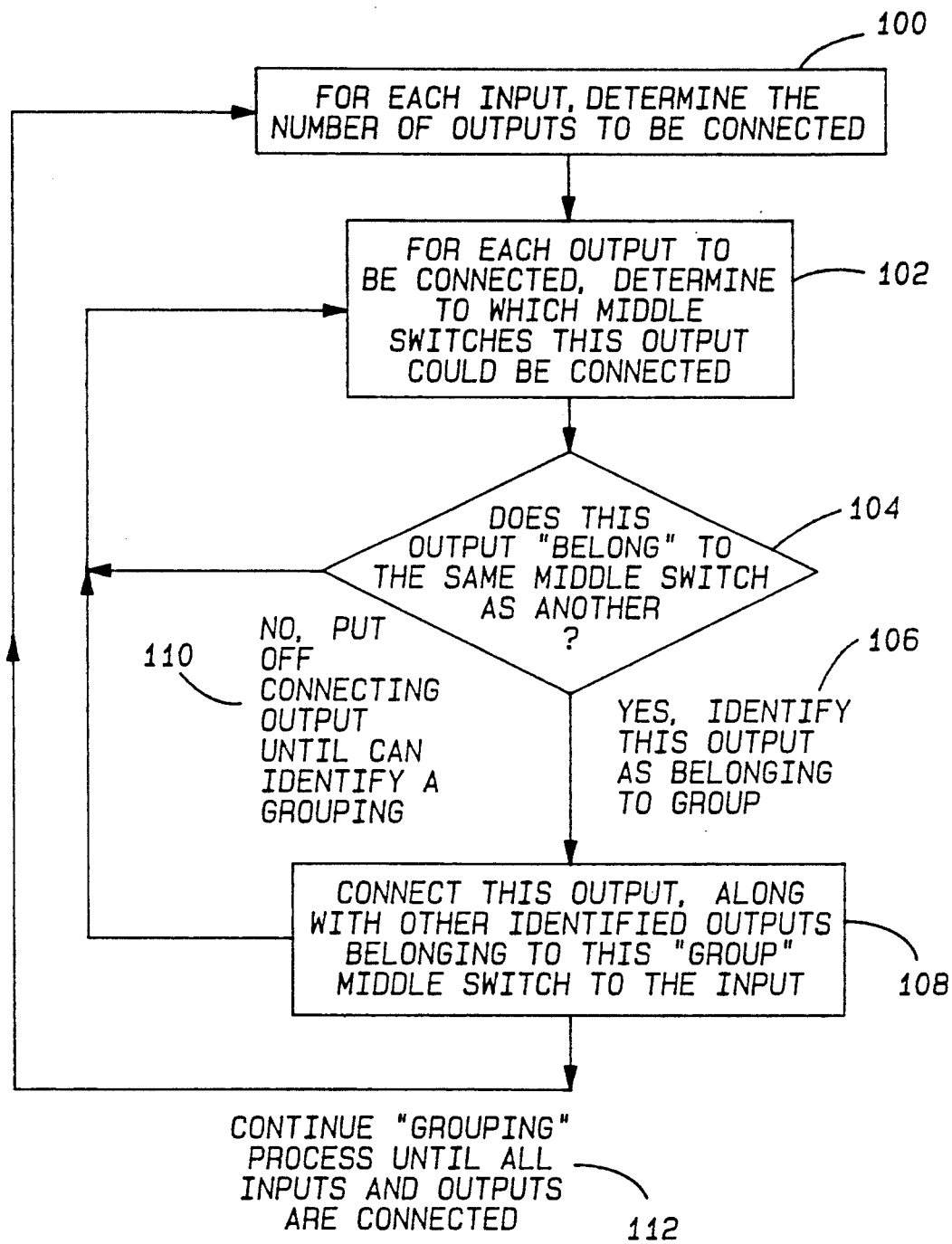
FIG. 7 is a flowchart illustrating the preferred embodiment of the network switch control scheme.

FIG. 7 is a flow chart of the logic process involved in the smart connection network control scheme. As illustrated, for each input the number of outputs to be connected is determined 100. Then, once the outputs have been identified, it is determined to which middle switches that particular output could be connected 102 based on which one is currently broadcasting the desired input to the greatest number of output switches. All outputs belonging to the same middle switch are grouped together 104, 106 and connected to the input 108. The connection of the input to outputs belonging to other groups is deferred until a grouping comprising those outputs can be created 110. This grouping process is continued until all inputs and outputs are connected 112. It can be appreciated by one of ordinary skill in the art that the pseudocode used in the flow chart to represent the logic process is provided for the purposes of illustration and explanation. One could readily form an actual sequence of logic steps using conventional coding languages based upon this pseudocode representation.

Figure 8:
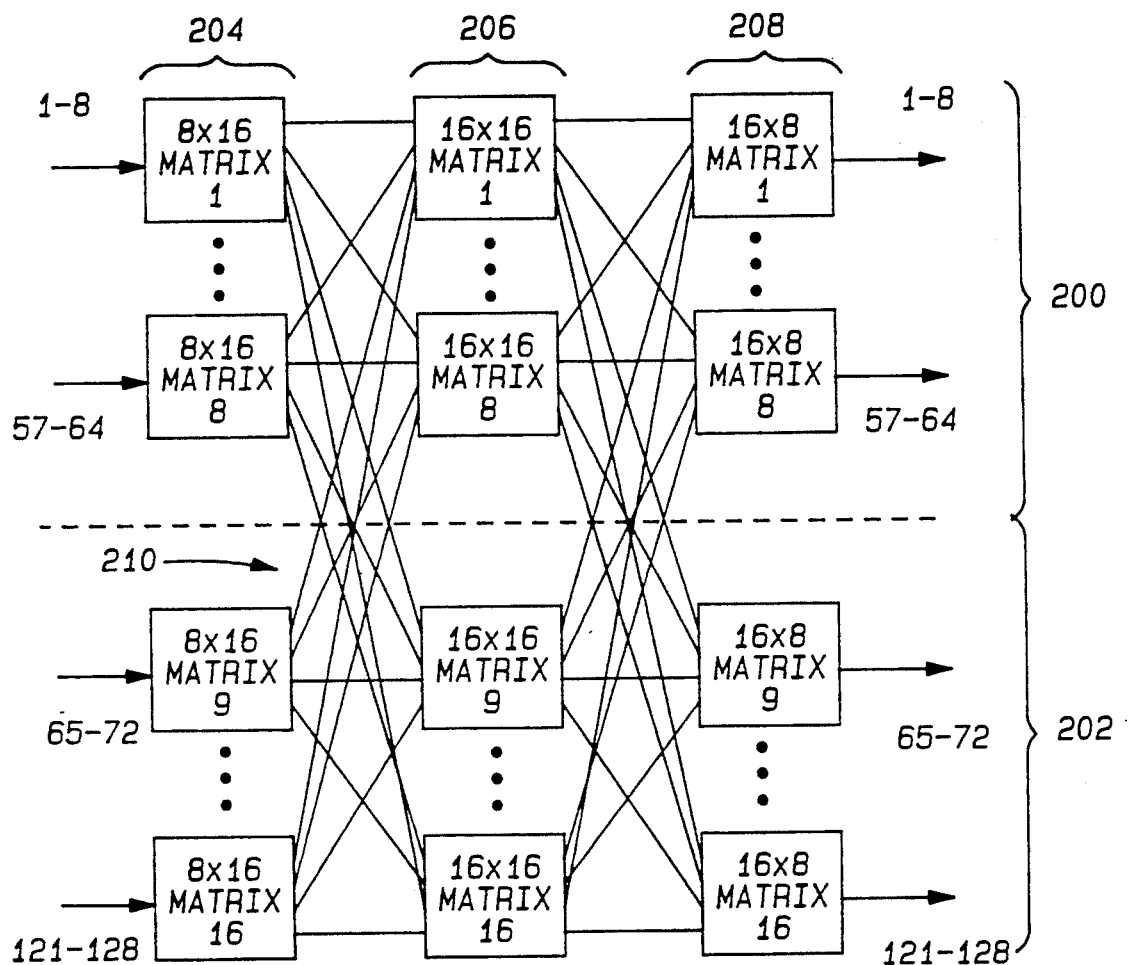
FIG. 8 is a block diagram illustrating a three-stage 128×128 network.

In order to further optimize the system with regard to ease of implementation and serviceability, the three stage switch generally described in conjunction with FIG. 2 has been implemented in hardware as shown in FIG. 8. More particularly, the switch illustrated in FIG. 8 is a 128×128 three stage network. Implemented as two separate circuit boards 200, 202, the network includes input switches 204, middle switches 206 and output switches 208. The switches 204-208 are 16×16 matrix switches, commercially available from Triquint Semiconductor of Beaverton, Oreg. It should be noted that in order to meet the nonblocking criteria $m \geq 2n-1$, only fifteen middle stage switches would be required; however, sixteen middle stage switches 206 have been provided to make the network more symmetric. The symmetric network can be incrementally constructed using a basic building block consisting of an input, a middle, and an output switch. The input switches 204 have been configured as 8×16 matrixes, using only eight of the sixteen available inputs. Similarly, the output switches 208 have been configured as 16×8 matrixes using only eight of the sixteen available inputs. This particular configuration allows for added interconnects between the input switches 204 and the middle switches 206 as well as the middle switches 206 and the output switches 208. The high speed signals switched by this switch run point to point, with no fan out required.

It can of course be appreciated that the particular switches chosen are well within the design choices of a practioner skilled in the art. For example, the 16×16 matrix switches could be configured as four 4×4 switches and the number of input and output switches could be reduced by a factor of four to implement a 32×32 switch. This configuration can be achieved by one quarter of the input, middle and output switch building blocks required for the 128×128 switch. To increase the size of the switch from 128×128 to 1,024×1,024, the middle switch becomes a three stage 128×128 switch itself, and the number of input and output switches is increased by a factor of eight.

Figure 9:
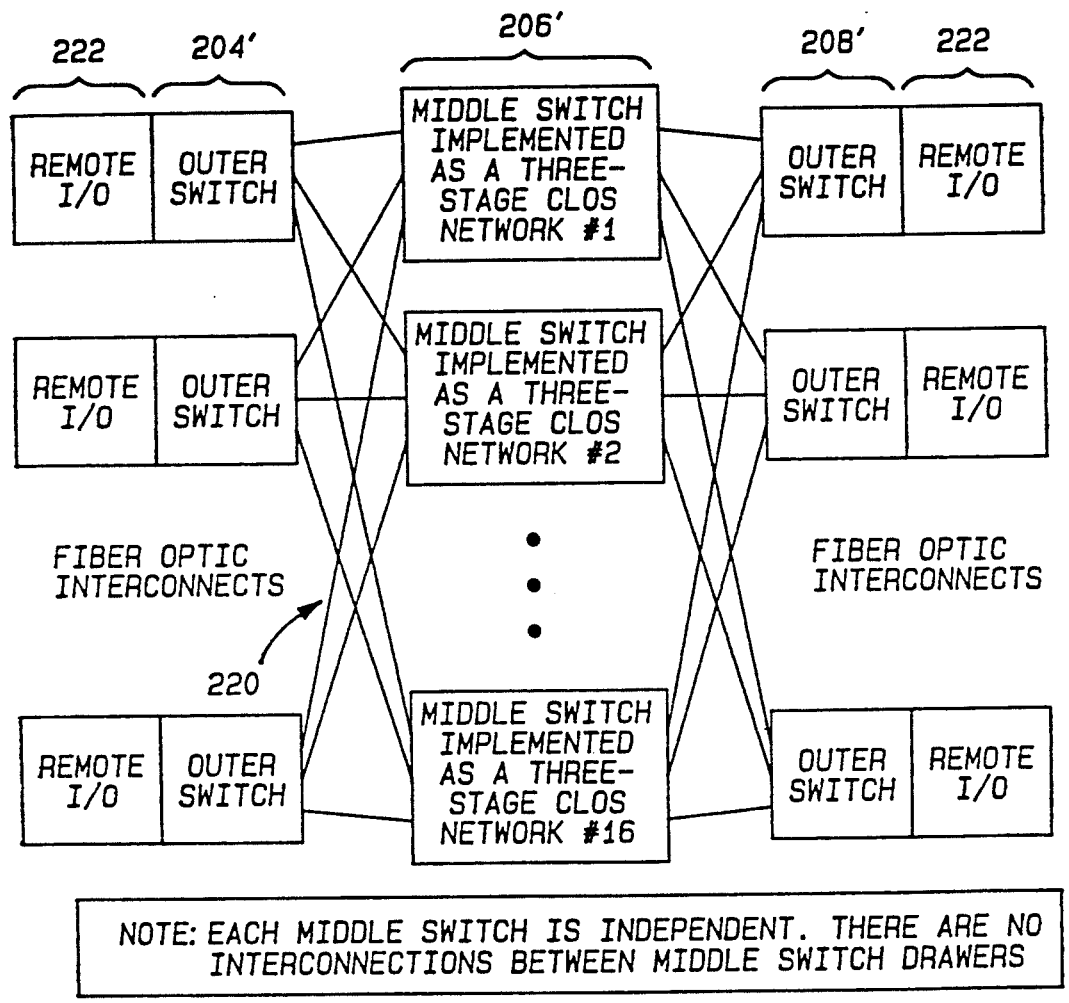
FIG. 9 is an illustration of the preferred embodiment of the hardware implementation, a distributed five-stage switch architecture.

As shown in FIG. 9, this embodiment is implemented as a five-stage 1,024×1,024 switch network, where the one hundred twenty eight 8×16 input switches 204' and one hundred twenty eight 16×8 output switches 208' connect to sixteen 128×128 middle switches 206' which each are themselves the three stage 128×128 network described in FIG. 8. In this configuration, each of the sixteen 128×128 middle switches 206' are completely independent of each other, allowing each middle switch to be implemented in a single drawer. This greatly simplifies the high-speed interconnect structure by keeping all the electrical signals within the drawer. All external high-speed interconnects can be made over fiber optic cables 220 that go to the input and output switches 204', 208' collocated with the remote interfaces 222. The network has built-in redundancy because, as discussed earlier, there is one more middle switch than is required for the network to be nonblocking. Thus, if a failure takes down an entire middle switch drawer, the network can still provide full performance.

The distributed, systematic five stage network switch is an extremely robust network, unlike a crossbar switch. This is because the switch is symmetric and possesses sufficient redundancy to compensate for the loss of a switching block without compromising the switch's capacity. In contrast, the failure of a single switching point in a crossbar network disables that particular interconnect, reducing the switch's ability to handle and switch signals. Also, unlike the crossbar, the 1024×1024 network of the present invention requires only 1,024 16×16 crosspoint switches, whereas the crossbar network would require 4,096 expandable 16×16 crosspoint switches. Thus, the switch of the present invention is less expensive to build and less expensive to maintain. Moreover, the 16×16 crosspoint switches are commercially available parts, making this switch easy to construct and repair. Another additional feature of the network is that all input and output path delays are equal regardless of the path taken because the signals always pass through five 16×16 switches. In a crossbar network, input to output path delays are not always equal because a given signal can travel through between one and sixty-four expandable 16×16 switches, depending upon the output selected. This improves the switch's capabilities and reduces variation between switched signal input and output timing. The most important advantage, however, of the present invention is that the switch is symmetric and constructed using multiples of basic 16×16 and 128×128 switch blocks. Indeed, the 128×128 switch block itself is constructed using the 16×16 blocks. This makes the switch extremely easy to expand without requiring unique switch block construction. Specifically, the switch capacity can be readily expanded by simply adding successive stages of 16×16 switching blocks. From a manufacturing and repair point of view, being able to construct a variety of switches having different capacities using the same small basic building blocks reduces design costs, reduces stock costs and reduces repair time.

The foregoing description of the presently preferred embodiment has been provided for the purposes of illustration. It can be appreciated by one of ordinary skill in the art that modifications could be exercised to this invention without departing from the spirit or scope.

What is claimed is:

1. A multiple stage switch for switching a plurality of asynchronous signals at high speeds, said multiple stage switch comprising:

input stage means for receiving and switching said plurality of signals, said input stage means comprising a plurality of first switch blocks, wherein each of said first switch blocks of said input stage means switches a subset of said plurality of signals;

intermediate stage means connected to said input stage means for receiving and switching said plurality of signals after said signals have been switched through said input stage means, said intermediate stage means comprising a plurality of second switch blocks;

output stage means connected to said intermediate stage means for receiving and switching said plurality of signals after said signals have been switched through said intermediate stage means, said output stage means comprising a plurality of third switch blocks, wherein each of said third switch blocks of said output stage means switches a subset of said plurality of signals to corresponding predetermined destinations; and control means for routing each of said signals from said input stage means, through said intermediate stage means, through said output stage means to said corresponding predetermined destinations, said control means including a control scheme, wherein said control means in response to said control scheme, for each signal and its corresponding predetermined destination, selects one or more of the second switch blocks of said intermediate stage means yielding the most active connections between said signals at said input stage means and said signals corresponding predetermined destinations at said output stage means, and wherein said control means selects among the remaining second switch blocks of said intermediate stage means yielding the next most active connections until all signals at said input stage means are connected to their corresponding predetermined destinations at said output stage means.

2. A multiple stage switch as set forth in claim 1 wherein said input stage means has twice as many outgoing connections as incoming connections, wherein said signals are interfaced to said input stage means at said incoming connections and wherein said outgoing connections interconnect said input stage means with said intermediate stage means.

3. A multiple stage switch as set forth in claim 1 wherein said output stage means has twice as many incoming connections as outgoing connections, wherein said signals are interfaced from said output stage means to said predetermined destinations at said outgoing connections and wherein said incoming connections interconnect said output stage means with said intermediate stage means.

4. A system for switching a plurality of asynchronous signals at high speeds, each asynchronous signal having a corresponding predetermined destination, the system comprising:

a plurality of switch blocks interconnected to form
an input stage including a plurality of first switch blocks,
a middle stage including a plurality of second switch blocks, and
an output stage including a plurality of third switch blocks, wherein said signals are received at said input stage, switched through said input stage to said middle stage, switched through said middle stage to said output stage and switched through said output stage to said predetermined destinations, and wherein each switch block switches a subset of said plurality of signals, and wherein each of said first switch blocks comprising said input stage are interconnected to a subset of said plurality of signals to receive and switch said subset of signals to one or more of said second switch blocks comprising said middle stage, and wherein each of said third switch blocks comprising said output stage are interconnected to a subset of said predetermined destinations, and wherein each of said second switch blocks comprising said middle stage switches a subset of said signals to said third switch blocks comprising said output stage connected to said signals' corresponding predetermined destinations; and control means for establishing switching paths in accordance with a highest yield criteria, said highest yield criteria involving selecting which of said second switch blocks comprising said middle stage yield the greatest number of active switching paths from a given said first switch block of said input stage to a given said third switch block of said output stage, wherein said control means establishes switching paths between said input, middle and output stages based upon said highest yield criteria until all signals are switched to their corresponding predetermined destination.

5. An expandable switch for switching a plurality of asynchronous signals at high speeds, said expandable switch comprising a plurality of switch blocks adapted to switch a subset of said plurality of asynchronous signals, said plurality of switch blocks interconnected to form an input stage,
a middle stage, and
an output stage, wherein said input stage comprises a plurality of first switch blocks connected to said signals such that a given subset of said signals are connected to a given one of said first switch blocks, and wherein said middle stage comprises a plurality of second switch blocks where each of the second switch blocks comprising said middle stage is connected to each of the first switch blocks comprising said input stage, and wherein said output stage comprises a plurality of third switch blocks where each of the third switch blocks comprising said output stage is connected to each of the second switch blocks comprising said middle stage and wherein a given subset of predetermined destinations are connected to a given one of said third switch blocks, and wherein additional signals can be switched to additional predetermined destinations by connecting additional switch blocks to the expandable switch without disturbing the existing connections between the input, middle and output stages; and control means for selecting, for each said signal and its corresponding predetermined destination, a switch path from said input stage through said middle stage to said output stage, wherein said second switch blocks yielding the greatest number of active connections between said first switch blocks receiving signals and said third switch blocks connected to said signals' corresponding predetermined destinations are selected first, and wherein successive said second switch blocks are selected until all signals are connected to their corresponding predetermined destinations via a switch path.

6. A method for switching a plurality of asynchronous signals at high speeds to corresponding predetermined destinations using a plurality of switch blocks, said method comprising:

forming a multiple stage switch from said plurality of switch blocks, said multiple stage switch formed to have an input stage comprised of a plurality of first switch blocks, an intermediate stage comprised of a plurality of second switch blocks and an output stage comprised of a plurality of third switch blocks;

distributively connecting said signals to said input stage, where each said first switch block is connected to a subset of said signals whereby said signals are distributively connected amongst said first switch blocks;

distributively connecting said predetermined destinations to said output stage, where each said third switch block is connected to a subset of said predetermined destinations whereby said predetermined destinations are distributively connected amongst said third switch blocks;

interconnecting said second switch blocks with said first switch blocks and said third switch blocks to form switching paths, wherein each said first switch block is interconnected with each said second switch block and wherein each said third switch block is interconnected with each said second switch block;

successively selecting, from among said second switch blocks, second switch blocks yielding the greatest number of active switching paths between said signals and their corresponding predetermined destinations until all said signals have at least one selected switching path to their corresponding predetermined destinations; and switching said signals to their corresponding predetermined destinations through said multiple stage switch via said selected switching paths.

7. A method for switching a greater plurality of asynchronous signals than in the method set forth in claim 6, said method comprising:

forming a new input stage comprised of a plurality of fourth switch blocks and a new output stage comprised of a plurality of fifth switch blocks;

distributively connecting said signals to said fourth switch blocks;

distributively connecting said predetermined destinations to said fifth switch blocks;

interconnecting said fourth switch blocks with said first switch blocks, and interconnecting said fifth switch blocks with said third switch blocks to form new switching paths through a new multiple stage switch where said input, intermediate and output stages form a new intermediate stage; and successfully selecting, from among said first, second and third switching blocks, first, second and third switch block combinations yielding the greatest number of new active switching paths between said signals and their corresponding predetermined destinations until all said signals have at least one selected new switching path to their corresponding predetermined destinations; and switching said signals to their corresponding predetermined destinations through said new multiple stage switch via said selected new switching paths.

* * * * *